C. T. McLELLAN.
EGG CANDLER.
APPLICATION FILED DEC. 13, 1919.
1,352,822.
Patented Sept. 14, 1920.
2 SHEETS—SHEET 1.
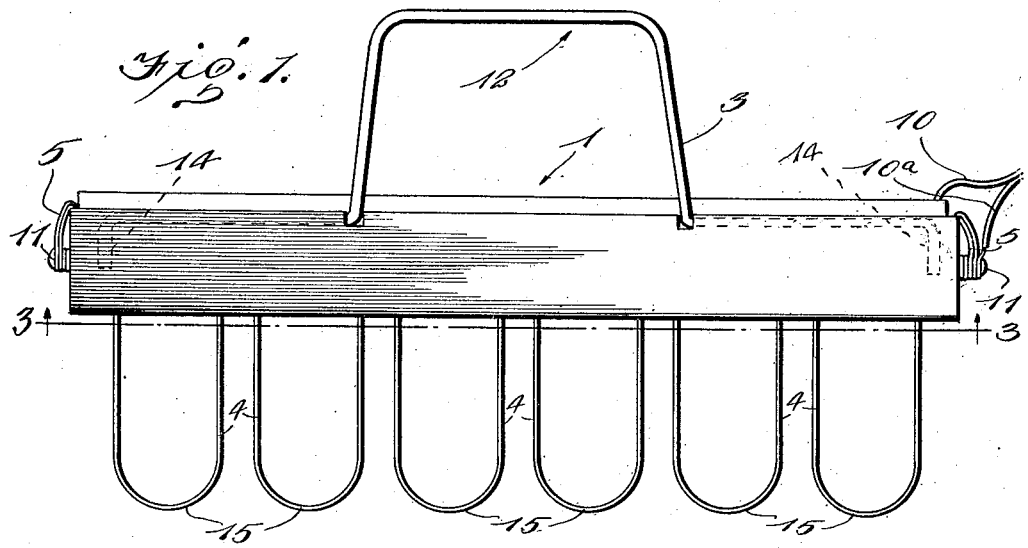
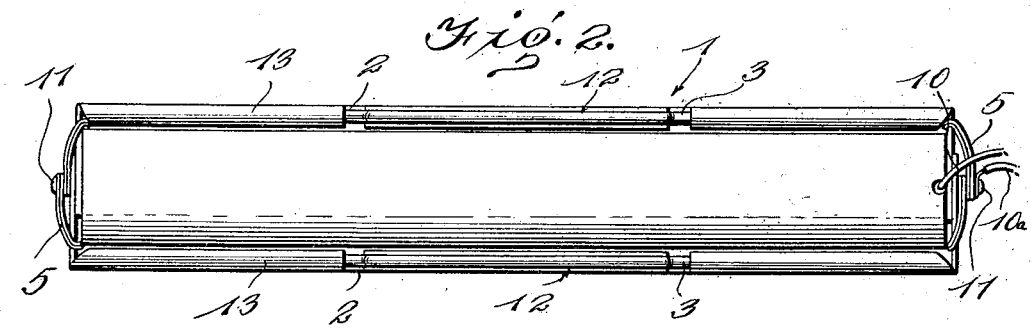
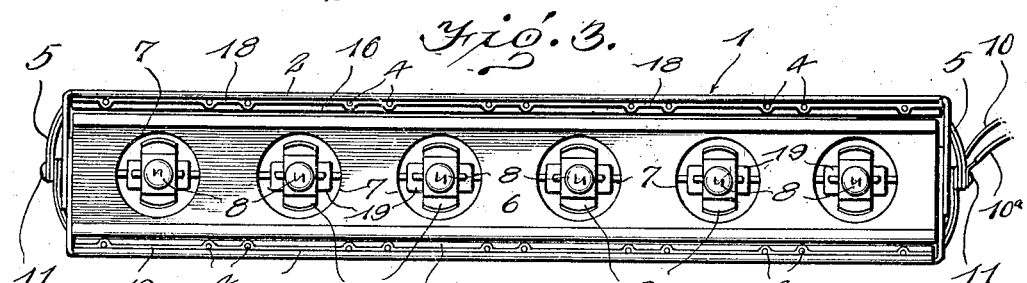
Witnesses
J. R. Pierce
Inventor
C. T. McLellan
By H. B. Willson & Co.
Attorneys

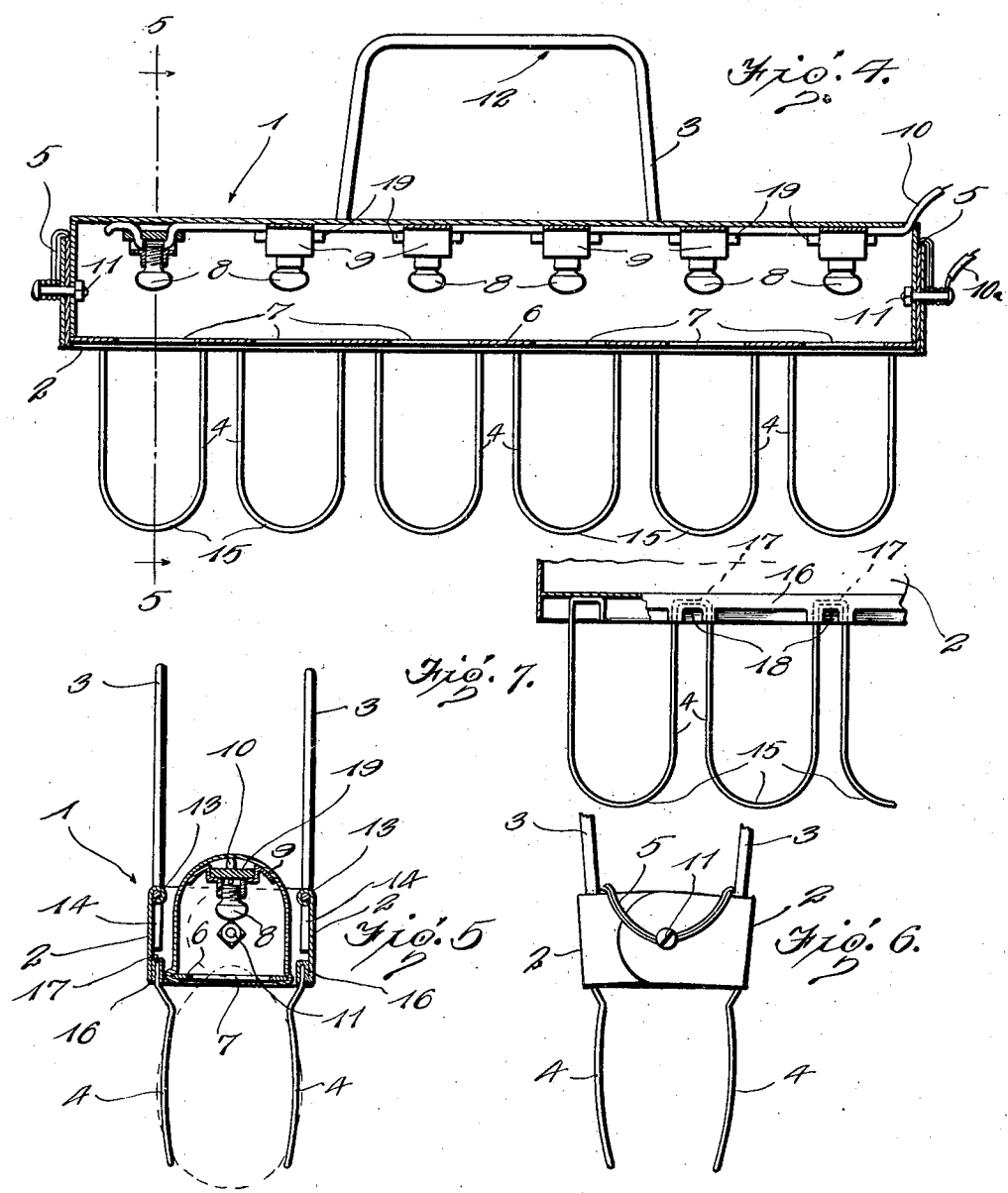

UNITED STATES PATENT OFFICE.

CHARLES T. McLELLAN, OF SIOUX CITY, IOWA.

EGG-CANDLER.

1,352,822. Specification of Letters Patent. Patented Sept. 14, 1920.

Application filed December 13, 1919. Serial No. 344,614.

*To all whom it may concern:*

Be it known that I, CHARLES T. MC-LELLAN, a citizen of the United States, residing at Sioux City, in the county of Woodbury and State of Iowa, have invented certain new and useful Improvements in Egg-Candlers; and I do declare the following to be a full, clear, and exact description of the invention, such as will enable others skilled in the art to which it appertains to make and use the same.

This invention relates to improvements in egg candlers.

The primary object is to simplify, reduce the cost of manufacturing, and decidedly improve the construction of Patent No. 1,220,439, granted to D. G. Danner and myself on March 27, 1917, for the same type of device.

Another object of the invention is to improve and change the construction of the device in such a manner that the eggs may be easily lifted from a crate and also readily and easily ejected from the candler without liability of them becoming broken.

A further object of the invention is to provide an egg candler which is a great deal more simple in construction than devices known to me, one which is strong, durable, efficient in use, and comparatively inexpensive to manufacture.

Other objects and advantages of the invention will be apparent during the course of the following description.

In the accompanying drawings forming a part of this specification and in which like numerals are employed to designate like parts throughout the same, Figure 1 is a side elevation of an egg candler constructed in accordance with my invention.

Fig. 2 is a top plan view thereof.

Fig. 3 is an inverted view taken on the plane of the line 3—3 of Fig. 1.

Fig. 4 is a central longitudinal section of the device.

Fig. 5 is a transverse vertical section on the plane of the line 5—5 of Fig. 4.

Fig. 6 is an end view.

Fig. 7 is a detail view of a portion of the device illustrating the manner in which the egg-engaging members are secured in position.

In carrying out my invention I employ an elongated casing 1 which is adapted to extend over a row of eggs and which contains suitable illuminating elements by means of which the eggs are tested. Disposed on opposite sides of this casing 1 are rocking members 2 which are pivotally connected to the opposite ends of the casing. Handles 3 are carried by and extend from one edge of the rocking members 2, and a plurality of oppositely arranged egg gripping members 4 are carried by and extend from the opposite edges of the rocking members and are normally actuated toward each other by means of a spring 5 which is associated with the rocking members.

Casing 1 may be of any suitable shape or design, but I have shown it as being substantially arch-shaped in configuration and it is closed at its bottom by means of a plate 6 which is provided with a plurality of spaced openings 7, disposed opposite the illuminating elements or electric lights 8, and into which the ends of the eggs may extend. Any suitable illuminating means may be employed, such as for instance, small electric lights 8 which are carried by the lamp sockets 9 which are in turn secured to the casing 1 at spaced intervals, the current being supplied to the lights by means of wires 10 and 10$^a$.

The rocking members 2, above referred to, are preferably in the form of metal plates, have their opposite ends bent laterally toward the other and overlapped as shown. Pivot pins 11 extend through the overlapped ends of the plates 2 and also through the opposite ends of the casing 1, permitting the plates 2 to rock. Plates 2 are actuated by means of the handles 3, each of which is preferably composed from a single piece of wire bent between its ends to form substantially U-shaped portions as indicated at 12. The opposite ends of the wire handles 3 extend through the rolled upper edges 13 of the plates 2, and the extremities of the wires are bent laterally at 14 and bear against the plates 2 by which they are carried, thus preventing rotation of the handles in one direction.

A plurality of egg-engaging members 4 are carried by the plates 2, and these egg-engaging members are disposed opposite each other and on opposite sides of the openings 7 in the plate 6, and when the device is in use, the egg is held between the opposed egg-engaging loops and a portion of the egg is permitted to extend through the opening 7 to permit the light to shine through the eggs, whereby the proper test may be made. While the egg-engaging members 4 may be of any other construction, I prefer to make them of two separate lengths of wire, and each length of wire is bent between its ends to form a plurality of loops 15. In order to secure the wire egg-engaging members to the rocking plates, I provide each plate with a flange 16 between which the wire egg-engaging loops are secured. By referring to Fig. 7 an idea of the manner in which these loops 15 are secured in position will be had. In this figure it will be seen that the portions of the wire 17 which connect the loops 15 are secured between the flanges 16, and these flanges are depressed as indicated at 18 so as to properly retain the wire in position. Spring 5 may be of any suitable design or construction, its purpose being to actuate the egg-gripping loops 15 toward each other and cause them to grip the egg sufficiently tight to prevent it from becoming disengaged from the loops. As shown, the spring 5 is coiled around the pivot pins 11 and its opposite ends engaged over the laterally bent ends of the plates 2.

The operation of the device is as follows: Assuming that the device is in its normal position such as indicated in Fig. 6, the operator will grasp the handles 3, and move them toward each other, thereby rocking the plates 2 on their pivots 11 and swinging the egg-engaging members 4 away from each other sufficiently to permit an egg to fit between the loops. Then the device will be placed over the row of eggs in a crate, and the handles gently released, whereby the spring 5 will actuate the egg-engaging loops toward each other until they obtain an effective grip on the eggs. After this the operator may lift the whole row of eggs up and turn the device upside down so as to cause the ends of the eggs to extend slightly through the openings 7 which form seats for them. When in this position the electric lights 8 may be put into operation whereby a light will shine through the eggs and permit the desired test to be made. I desire it to be understood that the wire from which the egg-engaging members is composed will be sufficiently resilient to permit the operator to readily disengage the bad eggs from the loops 15 without moving the handles toward each other, which operation might permit some of the eggs to accidentally fall. On the other hand, this wire is also to be sufficiently stiff to grip the eggs and prevent them from becoming disengaged from the loops 15 when the eggs are being lifted out of the crate before the device is moved to inverted or examining position.

With a device of the above construction it will be seen that the eggs can be quickly removed from one crate and candled, after which the fresh eggs may be placed in another crate and the bad eggs placed in a separate crate. It is also to be noted that the device is extremely light and may be handled very easily and rapidly.

From the foregoing description taken in connection with the accompanying drawings it is believed that the manner of using my device is entirely obvious, therefore, further description is deemed unnecessary.

It is to be understood that the form of my invention herein shown and described is to be taken as a preferred form of the same, and that various minor changes in the shape, size and arrangement of parts may be made without departure from the spirit of the invention or scope of the subjoined claims.

Although the lamp sockets 9 may be if any suitable construction, I prefer to form each one from a metal stamping which is substantially arch-shaped in configuration and has its opposite ends secured to the casing 1 in any suitable manner. This construction forms a space between the socket members and the casing 1 and insulating blocks 19 are fitted snugly in this space. Each block 19 is provided with spaced perforations through which one of the wires 10 passes. The other wire $10^a$ is grounded to the casing.

I claim:

1. A candling device comprising an elongated casing to extend over a row of eggs provided with a plurality of openings in one side thereof, illuminating elements disposed in the casing opposite the openings, rocking members disposed on opposite sides of the casing and pivotally secured to the ends of the casing, handles carried by and extending from one edge of the rocking members, egg-gripping members carried by and extending from the opposite edge of the rocking members and disposed on opposite sides of the openings in the casing, and spring means for actuating the egg-gripping members toward each other.

2. A device of the character set forth comprising a pair of plates having their opposite ends directed laterally toward each other and overlapped, an arch-shaped lamp-socket housing disposed between the plates, said housing being provided with a plurality of spaced openings into which a portion of the eggs may extend, a pivot pin passing through the overlapped ends of the plates and opposite ends of the housing, handles carried by said plates, egg-gripping members also carried by the plates, and spring means associated with the plates to actuate the egg-gripping members toward each other.

3. A device of the character set forth comprising spaced plates having their opposite ends directed laterally toward each other and pivotally connected together, handles carried by said plates, a plurality of egg-engaging members carried by the plates, and a spring co-acting with said plates for actuating them toward each other.

4. A device of the character set forth comprising a pair of plates having their opposite ends bent laterally toward each other and overlapped, pivot pins extending through said overlapped ends, a plurality of egg-engaging members carried by each plate, handles carried by said plates for moving the egg-engaging members toward and from each other, and spring means for actuating the egg-engaging members toward each other.

5. A device of the character set forth including a pair of spaced plates pivotally connected at their opposite ends, each of said plates having one of its edges rolled, two separate lengths of wire, each being bent between its ends to form a handle, the opposite ends of the wire being extended through the rolled edges of the plate, and the opposite extremities thereof being bent laterally and normally bearing against the plates to prevent rotation of the wire in one direction, and a plurality of egg-engaging members carried by each plate and movable toward and from each other when the handles are actuated.

6. A device of the character set forth comprising a casing adapted to contain a plurality of illuminating elements, rocking members associated with said casing, handles carried by said rocking members, and a plurality of egg engaging members also carried by said rocking members whereby when the rocking members are actuated, the egg engaging members will be moved toward and from each other.

7. An egg testing device comprising a casing provided in one of its sides with a plurality of spaced openings, a plurality of lamp socket members in said casing opposite the openings, each member being composed from a single stamping which is substantially arch-shaped, and is spaced from the wall of the casing, insulating blocks fitted snugly in said space between the casing and socket members, each block being provided with spaced perforations, a circuit wire extending through said perforations, and another wire grounded to said casing.

In testimony whereof I have hereunto set my hand.

CHARLES T. McLELLAN.